United States Patent [19]
Craig

[11] Patent Number: 5,900,460
[45] Date of Patent: * May 4, 1999

[54] PROCESS FOR THE SYNTHESIS OF STRUCTURED AQUEOUS DISPERSIONS OF POLYSILOXANES

[75] Inventor: Daniel Horace Craig, Schenectady, N.Y.

[73] Assignee: General Electric Company, Schenectady, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/778,926

[22] Filed: Jan. 3, 1997

[51] Int. Cl.⁶ .................................................. C08G 77/04
[52] U.S. Cl. ........................... 524/837; 524/838; 528/23; 525/477; 525/902
[58] Field of Search .................................... 524/837, 838; 528/23; 525/477, 902

[56] References Cited

U.S. PATENT DOCUMENTS

| | | | |
|---|---|---|---|
| 2,891,920 | 6/1959 | Hyde et al. | 524/837 |
| 4,859,740 | 8/1989 | Damrath et al. | 525/100 |
| 4,861,831 | 8/1989 | Damrath et al. | 525/100 |
| 4,865,917 | 9/1989 | Lindner et al. | 428/407 |
| 4,885,209 | 12/1989 | Lindner et al. | 428/420 |
| 5,223,586 | 6/1993 | Mautner et al. | 525/477 |
| 5,726,270 | 3/1998 | Craig | 528/23 |

FOREIGN PATENT DOCUMENTS

| | | |
|---|---|---|
| 459500A2 | 12/1991 | European Pat. Off. . |
| 705864A1 | 4/1996 | European Pat. Off. . |
| 744432A1 | 11/1996 | European Pat. Off. . |
| 850977A2 | 7/1998 | European Pat. Off. . |
| 850978A2 | 7/1998 | European Pat. Off. . |

OTHER PUBLICATIONS

European Search Report.
D.R. Weyenberg et al., J. Polymer Sci., "Anionic Emulsion Polymerization of Siloxanes", Part C (27), pp. 27–34, 1969.
D. Graiver et al., Rubber Chemistry and Technology, vol. 56, "Emulsion Polymerized Polydimethylsiloxane", pp. 918–926.
J.C. Saam et al., Journal of Polymer Science: Polymer Chemistry Edition, vol. 20, "Condensation Polymerization of Oligomeric Polydimethylsiloxanols in Aqueous Emulsion", pp. 3351–3368 (1982).
T.M. Obey et al., Journal of Colloid and Interface Science, 163, "Novel Monodisperse 'Silicone Oil'/Water Emulsions", pp. 454–463 (1994).
K.R. Anderson, Langmuir 1994, 10, "Surfactant–Stabilized Silicone Oil in Water Emulsion", pp. 2493–2494 (1994).

Primary Examiner—Margaret W. Glass
Attorney, Agent, or Firm—Noreen C. Johnson; Douglas E. Stoner

[57] ABSTRACT

A process for the acid-catalyzed synthesis of polysiloxane emulsions is discussed. The process utilizes pre-existing polysiloxane emulsion seeds to yield polysiloxane emulsions comprising optionally multi-layered mono-modal particles.

9 Claims, No Drawings

PROCESS FOR THE SYNTHESIS OF STRUCTURED AQUEOUS DISPERSIONS OF POLYSILOXANES

FIELD OF THE INVENTION

A process for the acid-catalyzed synthesis of polysiloxane emulsions is discussed. The process utilizes pre-existing polysiloxane emulsion seeds to yield polysiloxane emulsions comprising optionally multi-layered mono-modal particles.

BACKGROUND OF THE INVENTION

The manufacture of aqueous polysiloxane emulsions is a widely practiced art typically resulting in aqueous dispersions of broad particle size distributions. These dispersions have a broad utility, including the personal care, adhesives, and coating industries.

Current manufacturing practices encompass emulsification, into water, of pre-existing polysiloxane fluids and/or gums via standard high shear homogenization techniques to directly yield the dispersions. Alternatively, it is known to batch stir polysiloxane precursors in water in the presence of surfactants, under low shear non-homogenizing conditions, subsequent to thermal emulsion polymerization to yield the polysiloxane dispersion. These processes yield a dispersion having a broad particle size distribution. As in many areas of technology such as coatings, adhesives, inks, personal care and the like, which utilize polymer particles, particle size control can be critical to attain optimum performance of the material in its end use application. This is also true for polysiloxane emulsions where particle size has become increasingly important, for example in designing dispersions for the personal care industry.

Examples of polysiloxane emulsion polymerization processes have been known. Base catalyzed emulsion polymerization is disclosed in U.S. Pat. No. 2,891,920, which describes the process as base catalyzed with a cationic surfactant. European patent application EP 459500 A2 911204 also discloses a base catalyzed emulsion polymerization process. A base catalyzed emulsion polymerization process is thus described to comprise a process proceeding via an ionic mechanism involving pre-emulsifying cyclosiloxanes into water in the presence of a cationic surfactant and a source of hydroxide ion. These base catalyzed emulsion polymerization processes can yield high molecular weights, however reaction times are very long.

Acid catalyzed emulsion polymerization of siloxanes is also known. *Journal of Polymer Science*, Part C (27), 27, 1969 discusses the use of dodecylbenzenesulfonic acid as a catalyst and surfactant for the synthesis of polydimethylsiloxane emulsions from permethylcyclosiloxanes.

Semi-continuous processes for polysiloxane emulsions are described in Japanese patent application JP62141029 A2 870624. This process utilizes a continuous addition of a pre-emulsion of cyclosiloxanes precursor to a reactor containing large amounts of acid catalyst emulsifier. Particle sizes of polysiloxane emulsions thus formed are normally restricted to sizes below 150 nm.

Given a variety of processes disclosed for the production of polysiloxane emulsions, it is surprising that emulsion processes are still being sought which will allow simultaneous control of polysiloxane molecular weight as well as the dispersion particle size within a narrow range. It is also surprising that a process for acid catalyzed synthesis of high molecular weight pure polysiloxane emulsions having a particle size in the range of 50 nm to a few microns is not available. Polysiloxane emulsions having such a particle size in a desired narrow range i.e., mono-modal particles, can provide improved polysiloxane deposition and film formation in skin care products, and would also allow the manufacture of very high emulsion solids, for example, up to 75% by weight of high molecular weight polysiloxanes, at workable emulsion viscosities. Strict control of particle size and distribution would allow specific tailoring of the dispersion to the application, with a resulting increase in performance efficiency.

Publications that relate to polysiloxane emulsion technology surprisingly do not provide a process to make essentially mono-modal, or mono-modal and multi-layered particles. Mono-modal multi-layered particles can provide dispersions with multiple properties. Thus for example, different properties can be imparted to each layer of the particles in a polysiloxane emulsion.

There is thus a need to provide polysiloxane emulsions with improved particle size control in the particle size range of about 50 nm to a few microns. There is also a need to provide a process to make mono-modal polysiloxane emulsions having a predetermined particle size in a narrow range within the aforementioned particle size range. There is also a need to provide polysiloxane dispersions containing particles possessing multi-layered structures, and a process for making such multi-layered particles.

SUMMARY OF THE INVENTION

The instant invention is related to a process to make polysiloxane emulsions, comprising (a) preheating an aqueous reaction mixture (A), comprising polysiloxane emulsion seeds, and optionally containing a surfactant, to a temperature of about 30° C. to about 110° C.; and (b) adding to the aqueous reaction mixture (A), a mixture (B) comprising polysiloxane precursor, an acid catalyst-surfactant, and water, to form a polysiloxane emulsion comprising essentially mono-modal, optionally multi-layered particles having a pre-determined particle size ranging from about 50 nm to about 2 microns.

The instant invention is also related to polysiloxane dispersions containing particles possessing a core-shell, i.e., a multi-layered structure. The present invention thus provides polysiloxane emulsions having mono-modal particles optionally having a multi-layered core-shell type structure.

DETAILED DESCRIPTION OF THE INVENTION

The instant invention provides a process to make polysiloxane emulsions, comprising (a) preheating an aqueous reaction mixture (A), comprising polysiloxane emulsion seeds, and optionally containing a surfactant, to a temperature of up to about 110° C.; and (b) adding to the aqueous reaction mixture (A), a mixture (B) comprising polysiloxane precursor, an acid catalyst-surfactant, and water, to form a polysiloxane emulsion comprising essentially mono-modal, optionally multi-layered particles having a pre-determined particle size ranging from about 50 nm to about 2 microns.

In one aspect of the instant invention the mixture (B) is added in portions to reaction mixture (A) over a period of up to 24 hours. As provided by the instant invention, the polysiloxane seeds typically range in size from about 30 nm to about 200 nm. It is however understood that the size of such seeds can vary below 30 nm and above 200 nm.

The reaction mixture (A) used in the instant process can be preheated to a desired functional temperature. Typically the reaction mixture (A) is preheated to a temperature of from about 30° C. to about 110° C. The preferred temperature range being from about 75° C. to about 95° C. The instant process can, however, function at temperatures below 30° C. and above 110° C.

As provided by the instant invention, various surfactants can be used in the process of the instant invention. Acid catalyst-surfactants useful in the instant invention include surface-active sulfonic acids including alkyl-, alkylaryl-, aryl-sulfonic acids, mixtures of surface-active sulfonic acid salts with strong mineral acids or acids derived from monoalkyl, mono(alkaryl) and mono(alkyl) sulfates, mixtures of the salts of monoalkyl, mono(alk-aryl) and mono (aryl) sulfates and strong mineral acids. One may also use the various sulfonic acid catalysts/surfactants described in U.S. Pat. No. 3,294,725 which are incorporated herein by reference. Preferred surfactants include salts of alkyl, alkenyl, or alk-aryl sulfonic acids. A particularly preferred catalyst/surfactant being dodecylbenzenesulfonic acid.

The instant invention uses a polysiloxane precursor which is capable of undergoing condensation reactions. Preferred polysiloxane precursors are cyclosiloxanes which are described in the Encyclopedia of Polymer Science and Technology, Volume 15, 2nd Edition (1989), John Wiley and Sons. Particularly preferred are mixtures of cyclosiloxanes and octamethylcyclotetrasiloxane.

A preferred process of the instant invention is one wherein, (a) the aqueous reaction mixture (A) is preheated to a temperature of about 85° C. to about 95° C., comprises polysiloxane emulsion seeds from about 5% to about 50% by weight of the reaction mixture (A); and (b) the reaction mixture (B) comprises about 70% to about 75% polysiloxane precursor, from about 0.5% to about 2% acid catalyst-surfactant, and from about 23% to about 29.5% water, each by weight of the reaction mixture (B). In a further preferred process of the instant invention the ratio of reaction mixture (A) to reaction mixture (B) is about 1:3.

A further preferred process is one wherein the reaction mixture (A) is preheated to about 86° C., the polysiloxane precursor is octamethylcyclotetrasiloxane or a mixture of cyclosiloxanes; and the acid catalyst-surfactant is dodecylbenzene-sulfonic acid. A even further preferred process is one which yields polysiloxane emulsions essentially comprising particles having a core-shell type bilayer structure.

The mixture (B) used in the instant preferred process comprises the polysiloxane precursor and the acid catalyst-surfactant in a ratio of from about 94:6 to about 99.5:0.5. The more preferred ratio being about 95:5.

Another aspect of the instant invention provides a polysiloxane emulsion formed by a process of the instant invention. The polysiloxane emulsion essentially comprises optionally multi-layered mono-modal particles having a particle size of from about 50 nm to a few microns. The preferred polysiloxane emulsion comprises multi-layered mono-modal particles with a particle size of from about 50 nm up to about 2 microns. Particularly preferred is a polysiloxane emulsion comprising mono-modal particles with a core-shell type bi-layer structure. Also provided by the present invention is an emulsion wherein the core and shell(s) of the particles have different properties.

Also provided by the instant invention is a process to make polysiloxane emulsions, comprising:

(a) preheating an aqueous reaction mixture (A), comprising polysiloxane emulsion seeds, and optionally containing a surfactant, to a temperature of up to about 110° C.; and (b) concurrently adding water, a polysiloxane precursor, and an acid catalyst-surfactant to the reaction medium (A) at a rate sufficient to form a polysiloxane emulsion comprising essentially mono-modal, optionally multi-layered particles having a pre-determined particle size ranging from about 50 nm to about 2 microns.

A particularly significant aspect of the instant invention is controlling the amount of acid catalyst present, while the polysiloxane precursor is being added to the reactor in the presence of the seed material. Controlling the amount of the acid catalyst helps prevent undesirable formation of new polysiloxane emulsion particles derived solely from the addition of pre-emulsion. It is thus advantageous to add all of the acid catalyst into the pre-emulsion to ensure a fairly constant amount of this reaction component in the reaction mixture. A preferred ratio of acid catalyst-surfactant to the polysiloxane precursor is about 1% by weight of the polysiloxane precursor, although higher ratios can be used depending on the desired reaction solids and addition rate. One can, of course, maintain a constant ratio of the polysiloxane precursor to the acid catalyst-surfactant by various experimental techniques. Such techniques include simultaneous addition of the polysiloxane precursor and the acid catalyst-surfactant to the reaction mixture at an appropriate rate.

Polysiloxane compositions contemplated for synthesis into emulsion form utilizing the process of the instant invention can comprise linear, branched, crosslinked and functionalized polysiloxanes derived from linear silanols, bifunctional siloxanes or cyclosiloxanes, including copolymers of linear polysiloxanes with mono-, di-, tri- or tetra-functional siloxane monomers, reactive group containing alkoxy silane monomers such as epoxy, amino, carboxy, vinyl and hydride containing reactive mono-, di- and tri-functional materials. Thus silicone fluids, gums, resins and organo and hydride functional derivatives would be included in the emulsion compositions contemplated herein.

The advantages of the instant invention include the ability to control the particle size of the polysiloxane emulsions. It is thus possible to achieve polysiloxane emulsions having a particle size in the range of about 50 nm to a few microns.

A typical process of the instant invention involves using previously synthesized polysiloxane emulsions to act as emulsion seeds that serve as the core for the multi-layered particles formed by the instantly claimed invention. The newly synthesized polysiloxanes form around the emulsion seeds forming the outer layer, thus yielding the core-shell structure. These core-shell structured particles can be re-introduced in the reaction mixture, to act as emulsion seeds, thereby leading to the formation of a polysiloxane emulsion having triple layered particles. This process can be repeated to yield polysiloxane emulsions having multiple layered particles.

One advantage of obtaining multi-layered particles is that each layer can have distinct, similar or dissimilar properties. Thus, for example, the core can be made of a cross linked polysiloxane to provide film toughness. This core can then have an outer layer of linear polysiloxane which is known to provide good film forming properties. This process can be repeated, as described above, such that one can make polysiloxane emulsions comprising multi-layered particles of a desired particle size that can display multiple properties associated with each layer.

The process of the instant invention can function with or without a surfactant in the aqueous reaction mixture (A). A surfactant to helps stabilize the growing polysiloxane particles in the aqueous reaction medium. Typical surfactants that can be used in the instant invention include those selected from known groups of anionic, nonionic, or amphoteric surfactants. Preferred are anionic surfactants such as sulfates or sulfonates.

The polysiloxane precursors utilized in the instant process are generally cyclosiloxanes that can have different characteristics. These cyclosiloxanes form silanols, i.e., a —Si—OH group attached to a functionalized or non-functionalized polymer chain from acid-catalyzed ring opening reactions. It is believed that the final polysiloxane emulsions are formed by the condensation reaction, generally in the presence of an acid catalyst, thereby forming a [—Si—O—Si—] linkage. A typical example of the pre-emulsion polysiloxane precursor is octamethylcyclotetrasiloxane. A comprehensive list of the polysiloxane precursors can be found in "Silicones", Hardman & Torkelson, *Encyclopedia of Chemical Technology*, Volume 15, pp. 205–308, John Wiley & Sons, and is incorporated herein by reference.

As described herein, mono-modal signifies particle size in a narrow size distribution. Thus, for example, a mono-modal emulsion would mean an emulsion comprising particles having a size distribution in a narrow range. The size distribution can vary from about 50 nm to a few microns, as discussed above.

The different aspects of the instant invention are illustrated by the following examples. These examples illustrate the applicability of the process of the instant invention in controlling the particle size of a acid-catalyzed polysiloxane emulsion, and in providing novel polysiloxane emulsions of narrow particle size distribution i.e., narrow mono-modal or mono-dispersed, lower emulsion viscosity than the viscosity of a corresponding broad distribution emulsion of the same average particle size, and layered/core-shell particle structures. The following examples only illustrate the process of the instant invention and should not be construed to limit the scope of the instant invention in any manner.

EXAMPLE 1

Into a three-neck 1000 ml round bottom flask, equipped with a stirrer, a condenser, a feed port, a temperature probe, and a heating mantle was added 150 g water and 150 g of a 48.5% solids polysiloxane emulsion with particle size Dv=270 nm, Dn=163 nm, and Dv/Dn=1.45. The mixture was agitated continuously and heated to 85° C. at which point a pre-emulsified mixture of 110 g water, 3 g dodecylbenzenesulfonic acid (DDBSA), and 300 g octamethylcyclotetrasiloxane was added to the round bottom flask over 90 minutes. The reaction mixture was heated for an additional 2 hours beyond the completion of the addition of the pre-emulsion, then cooled to room temperature and characterized.

EXAMPLE 2

Into a three-neck 1000 ml round bottom flask, equipped with a stirrer, a condenser, a feed port, a temperature probe, and a heating mantle was added 150 g water and 150 g of a 48.2% solids polysiloxane emulsion with particle size Dv=185 nm, Dn=150 nm, and Dv/Dn=1.2. The mixture was agitated continuously and heated to 85° C. at which point a pre-emulsified mixture of 110 g water, 3 g dodecylbenzenesulfonic acid, and 300 g octamethylcyclotetrasiloxane was added to the reactor over 90 minutes. The reaction mixture was heated for an additional 4 hours beyond the completion of the addition of the pre-emulsion, then cooled to room temperature and characterized.

EXAMPLE 3

Into a three-neck 1000 ml round bottom flask, equipped with a stirrer, a condenser, a feed port, a temperature probe, and a heating mantle was added 150 g water and 150 g of the emulsion produced in example #2. The mixture was agitated continuously and heated to 85° C. at which point a pre-emulsified mixture of 100 g water, 4 g dodecylbenzenesulfonic acid, and 310 g octamethylcyclotetrasiloxane was added over 90 minutes. The reaction mixture was heated for an additional 4 hours beyond the completion of the addition of the pre-emulsion, then cooled to room temperature and characterized.

EXAMPLE 4

Into a three-neck 1000 ml round bottom flask, equipped with a stirrer, a condenser, a feed port, a temperature probe, and a heating mantle was added 150 g water and 150 g of a 47.6% solids polysiloxane emulsion with particle size Dv=234 nm, Dn=90 nm, and Dv/Dn=2.6. The mixture was agitated continuously and heated to 85° C. at which point a pre-emulsified mixture of 178 g water, 5.3 g dodecylbenzenesulfonic acid, and 552 g octamethylcyclotetrasiloxane was added to the reactor over 90 minutes. The reaction mixture was heated for an additional 4 hours beyond the completion of the addition of the pre-emulsion, then cooled to room temperature and characterized.

EXAMPLE 5

Into a three-neck 1000 ml round bottom flask, equipped with a stirrer, a condenser, a feed port, a temperature probe, and a heating mantle was added 250 g water, 150 g of a 39% solids polysiloxane emulsion with particle size Dv=160 nm, Dn=136 nm, and Dv/Dn=1.1, 3 g dodecylbenzene-sulfonic acid, and 310 g octamethylcyclotetrasiloxane. The mixture was agitated continuously and heated to 87° C. for 4 hours, then cooled to room temperature and characterized.

EXAMPLE 6

Into a three-neck 1000 ml round bottom flask, equipped with a stirrer, a condenser, a feed port, a temperature probe, and a heating mantle was added 200 g water and 100 g of a 44% solids polysiloxane emulsion with particle size Dv=244 nm, Dn=182 nm, and Dv/Dn=1.3. The mixture was agitated continuously and heated to 86° C. at which point a pre-emulsified mixture of 100 g water, 3 g dodecylbenzenesulfonic acid, and 310 g octamethylcyclotetrasiloxane was added to the reactor over 120 minutes. The reaction mixture was heated for an additional 4 hours beyond the completion of the addition of the pre-emulsion, then cooled to room temperature and characterized.

EXAMPLE 7

Into a three-neck 1000 ml round bottom flask, equipped with a stirrer, a condenser, a feed port, a temperature probe, and a heating mantle was added 150 g water and 150 g of a 48.9% solids polysiloxane emulsion with particle size Dv=333 nm, Dn=297 nm, and Dv/Dn=1.1. The mixture was agitated continuously and heated to 86° C. at which point a pre-emulsified mixture of 100 g water, 6 g dodecylbenzenesulfonic acid, and 310 g octamethylcyclotetrasiloxane was added to the reactor over 120 minutes. The reaction mixture was heated for an additional 5 hours beyond the completion of the addition of the pre-emulsion, then cooled to room temperature and characterized.

EXAMPLE 8

Into a three-neck 1000 ml round bottom flask, equipped with a stirrer, a condenser, a feed port, a temperature probe, and a heating mantle was added 250 g water, 150 g of a 48.9% solids polysiloxane emulsion with particle size Dv=333 nm, Dn=297 nm, and Dv/Dn=1.1, 3 g dodecylbenzene-sulfonic acid, and 316 g octamethylcyclotetrasiloxane. The mixture was agitated continuously and heated to 86° C. for 6 hours, then cooled to room temperature and characterized.

EXAMPLE 9

Into a three-neck 1000 ml round bottom flask, equipped with a stirrer, a condenser, a feed port, a temperature probe, and a heating mantle was added 300 g water, 150 g of a 51.2% solids polysiloxane emulsion with particle size Dv=224 nm, Dn=217 nm, and Dv/Dn=1.03, 4.5 g dodecylbenzene-sulfonic acid, and 465 g octamethylcyclotetrasiloxane. The mixture was agitated continuously and heated to 86° C. for 7 hours, then cooled to room temperature and characterized.

EXAMPLE 10

Into a three-neck 1000 ml round bottom flask, equipped with a stirrer, a condenser, a feed port, a temperature probe, and a heating mantle was added 150 g of a 44% solids polysiloxane emulsion with particle size Dv=272 nm, Dn=199 nm, and Dv/Dn=1.4. The mixture is agitated continuously and heated to 86° C. at which point a pre-emulsified mixture of 100 g water, 2 g dodecylbenzene-sulfonic acid, and 310 g linear polydimethylsilanol (DP=40) is added to the reactor over 90 minutes. The reaction mixture was heated for an additional 5 hours beyond the completion of the addition of the pre-emulsion, then cooled to room temperature and characterized.

EXAMPLE 11

Into a three-neck 1000 ml round bottom flask, equipped with a stirrer, a condenser, a feed port, a temperature probe, and a heating mantle was added 150 g of a 52% solids polysiloxane emulsion with particle size Dv=540 nm, Dn=242 nm, Dv/Dn=1.4, and containing 3% by weight of total polysiloxane of tetramethyltetravinylcyclotetrasiloxane, as a reactive functional comonomer, and 150 g of water. The mixture is agitated continuously and heated to 86° C. at which point a pre-emulsified mixture of 100 g water, 3 g dodecylbenzenesulfonic acid, and 310 g octamethylcyclotetrasiloxane was added to the reactor over 150 minutes. The reaction mixture was heated for an additional 4 hours beyond the completion of the addition of the pre-emulsion, then cooled to room temperature and characterized.

EXAMPLE 12

Into a three-neck 1000 ml round bottom flask, equipped with a stirrer, a condenser, a feed port, and a temperature probe was added 150 g water and 150 g of a 48.9% solids polysiloxane emulsion with particle size Dv=333 nm, Dn=297 nm, and Dv/Dn=1.1. The mixture is agitated continuously at room temperature while a pre-emulsified mixture of 100 g water, 3 g dodecylbenzenesulfonic acid, and 300 g 3,000 cps linear polydimethylsilanol was added to it over 2.5 hours. The mixture was agitated continuously at room temperature for 4 hours, then let stand with no agitation for 24 hours prior to characterization.

EXAMPLE 13

Into a three-neck 1000 ml round bottom flask, equipped with a stirrer, a condenser, one feedport, a temperature probe, and a heating mantle was added 150 g water and 105 g of a 52.3% solids polysiloxane emulsion with particle size Dv=822 nm, Dn=713 nm, and the polydimethylsiloxane cross linked with 1.5% gamma-mercaptopropyltrimethoxysilane by weight of polysiloxane. The mixture was agitated continuously and heated to 85° C. at which point a pre-emulsified mixture of 100 g water, 3.4 g dodecylbenzenesulfonic acid (DDBSA), and 314 g octamethylcyclotetrasiloxane was added to the reactor over 435 minutes. The reaction mixture was heated for an additional 6 hours beyond the completion of the addition of the pre-emulsion, then cooled to room temperature and characterized.

EXAMPLE 14

Into a three-neck 1000 ml round bottom flask, equipped with a stirrer, a condenser, one feedport, a temperature probe, and a heating mantle was added 150 g water and 150 g of a 52.3% solids polysiloxane emulsion having particle size Dv=581 and Dn=468. The mixture is agitated continuously and heated to 86° C. at which point two separate feeds (1) a mixture of 100 g water and 3.2 g dodecylbenzenesulfonic acid (DDBSA-Witco 1298), and (2) 317 g octamethylcyclotetrasiloxane (D4) were added concurrently via separate pumps to the reactor over 315 minutes. The reaction mixture was heated for an additional 4.5 hours beyond completion of the addition of the pre-emulsion, then cooled to room temperature and characterized.

Weight percent solids were determined utilizing a CEM Labwave 9000 gravimetric microwave drier, with 20 minute heat times and at full microwave output. Particle size distributions were obtained utilizing a Nicomp 370 Submicron Particle Sizer instrument applying a gaussian analysis protocol. Viscosity measurements were taken utilizing a Brookfield Model RV viscosimeter.

Data collected for the resulting dispersions are provided in Table 1:

TABLE 1

| | | | | | | |
|---|---|---|---|---|---|---|
| | | Properties of Polydimethylsiloxane Emulsions | | | | |
| | Solids % by | Seed particle Size (nm) | | SF Emulsion PSD (nm) | | Comments |
| Example | weight | Dv | Dn | Dv | Dn | Dv/Dn (final emulsion viscosity) |
| 1 | 46.5 | 270 | 163 | 534 | 367 | 1.45 0.6% DDBSA cont., (280 cps) |
| 2 | 45 | 185 | 150 | 370 | 320 | 1.2 0.6% DDBSA cont., (550 cps) |
| 3 | 47.7 | 370 | 320 | 670 | 585 | 1.14 0.8% DDBSA cont., (35 cps) |

TABLE 1-continued

Properties of Polydimethylsiloxane Emulsions

| Example | Solids % by weight | Seed particle Size (nm) Dv | Seed particle Size (nm) Dn | SF Emulsion PSD (nm) Dv | SF Emulsion PSD (nm) Dn | Dv/Dn | Comments (final emulsion viscosity) |
|---|---|---|---|---|---|---|---|
| 4 | 57.1 | 234 | 90 | 700 | 570 | 1.2 | 0.6% DDBSA cont., (3,000 cps) |
| 5 | 48.9 | 160 | 136 | 333 | 297 | 1.12 | 0.6% DDBSA cont. |
| 6 | 46.2 | 244 | 182 | 647 | 623 | 1.04 | 0.6% DDBSA cont., (20 cps) |
| 7 | 49.8 | 333 | 297 | 600 | 533 | 1.1 | 1.2% DDBSA cont., (150 cps) |
| 8 | 49.8 | 333 | 297 | 673 | 584 | 1.2 | 0.6% DDBSA cont., (400 cps) |
| 9 | 55.7 | 224 | 217 | 448 | 355 | 1.3 | 0.6% DDBSA cont., (10,700 cps) |
| 10 | 72.4 | 272 | 199 | 312 | 209 | 1.5 | 0.4% DDBSA cont., linear silanol |
| 11 | 50.4 | 540 | 242 | 880 | 643 | 1.4 | 0.6% DDBSA cont., (84 cps) |
| 12 | 53.4 | 333 | 297 | 418 | 285 | 1.5 | 0.6% DDBSA cont., linear silanol |
| 13 | 49.6 | 822 | 713 | 1819 | 1024 | 1.8 | 0.5% DDBSA cont., |
| 14 | 50.2 | 581 | 468 | 1167 | 758 | 1.5 | 1.0% DDBSA; no pre-emulsion; 100% of catalyst dissolved in water was fed to the reactor concurrently with a separate cyclosiloxane feed |

Dv = volume average particle diameter in nanometers
Dn = number average particle diameter in nanometers
cps = viscosity in centipoise
% DDBSA = weight % DDBSA based on total recipe
cont. = continuous addition

What is claimed is:

1. A process for making polysiloxane emulsions useful in personal care comprising mono modal particles having a core-shell structure and a particle size ranging from about 50 nm to about 2 microns, which process comprises, adding a mixture (B), consisting essentially of cyclosiloxane, an acid catalyst-surfactant and water, to a mixture (A) comprising water, and polysiloxane emulsion seeds consisting essentially of polymerized cyclosiloxane, and optionally containing a surfactant, where prior to the addition of mixture (B) to mixture (A), mixture (A) is preheated and continuously agitated to a temperature of up to about 110° C., where there is utilized in the process to make the polysiloxane emulsions, a ratio by weight of mixture (A) to mixture (B) having a value of about 1:3.

2. A process of claim 1 wherein the mixture (B) is added over a period of up to 24 hours.

3. A process of claim 2 wherein the surfactant is a salt of alkyl, alkenyl, and alk-aryl sulfonic acids.

4. A process of claim 2 wherein the polysiloxane emulsion seeds range in size from about 30 nm to about 200 nm.

5. A process of claim 4 wherein the aqueous reaction mixture (A) is preheated to a temperature of about 100° C.

6. A process of claim 1 wherein the acid catalyst-surfactant is selected from alkyl, alkaryl, and aryl sulfonic acids.

7. A process of claim 1 wherein the reaction mixture is heated to about 86° C.; the polysiloxane precursor is octamethylcyclotetrasiloxane or a mixture of cyclosiloxanes; and the acid catalyst-surfactant is dodecylbenzenesulfonic acid.

8. A process of claim 7 wherein the ratio of the polysiloxane precursor to the acid catalyst-surfactant in reaction mixture (B) is about 95:5.

9. A polysiloxane emulsion formed by a process of claim 1.

* * * * *